United States Patent [19]

Casale

[11] 3,879,807
[45] Apr. 29, 1975

[54] BUTTON, PARTICULARLY SUITABLE FOR PILLOWS AND MATTRESSES

[76] Inventor: Roberto Casale, Via Gramsci 6, Cormano, Milan, Italy

[22] Filed: Sept. 27, 1973

[21] Appl. No.: 401,551

[30] Foreign Application Priority Data
July 27, 1973 Italy ............................... 27245/73

[52] U.S. Cl. ........................ 24/102 T; 24/230.5 TP
[51] Int. Cl. ........................ A44b 1/18; A44b 13/00
[58] Field of Search ............ 5/356; 24/90 B, 102 T, 24/230.5, 236, 237, 115 B, 115 C, 115 J, 115 K, 230.5 TP, 230.5 CR

[56] References Cited
UNITED STATES PATENTS

| | | | |
|---|---|---|---|
| 49,654 | 8/1865 | Saladee | 24/236 |
| 399,831 | 3/1889 | Burson | 24/230.5 TP |
| 622,770 | 4/1899 | Jones | 24/236 |
| 1,476,583 | 12/1923 | Beard et al. | 24/230.5 CR |
| 1,611,605 | 12/1926 | Newton et al. | 24/102 T |
| 2,787,435 | 4/1957 | Shields | 24/237 UX |
| 3,654,671 | 4/1972 | Berning | 24/102 T |

*Primary Examiner*—Donald A. Griffin
*Attorney, Agent, or Firm*—McGlew and Tuttle

[57] ABSTRACT

A button particularly for pillows and mattresses comprises a wide base portion with a hook shank connected to and extending out of the base portion and being curved around to enclose a hook loop. The interior of the shank within the loop is provided with an outwardly extending spring catch which extends partly across the open end of the loop. The outer leg of the hook shank extends backwardly toward and substantially perpendicular to the base and overlies and covers the spring catch. This outer leg portion has a terminal part which is made of triangular configuration with the sides diverging from the triangular in a direction toward the base so that the base of the triangular configuration is adjacent the button base.

2 Claims, 10 Drawing Figures

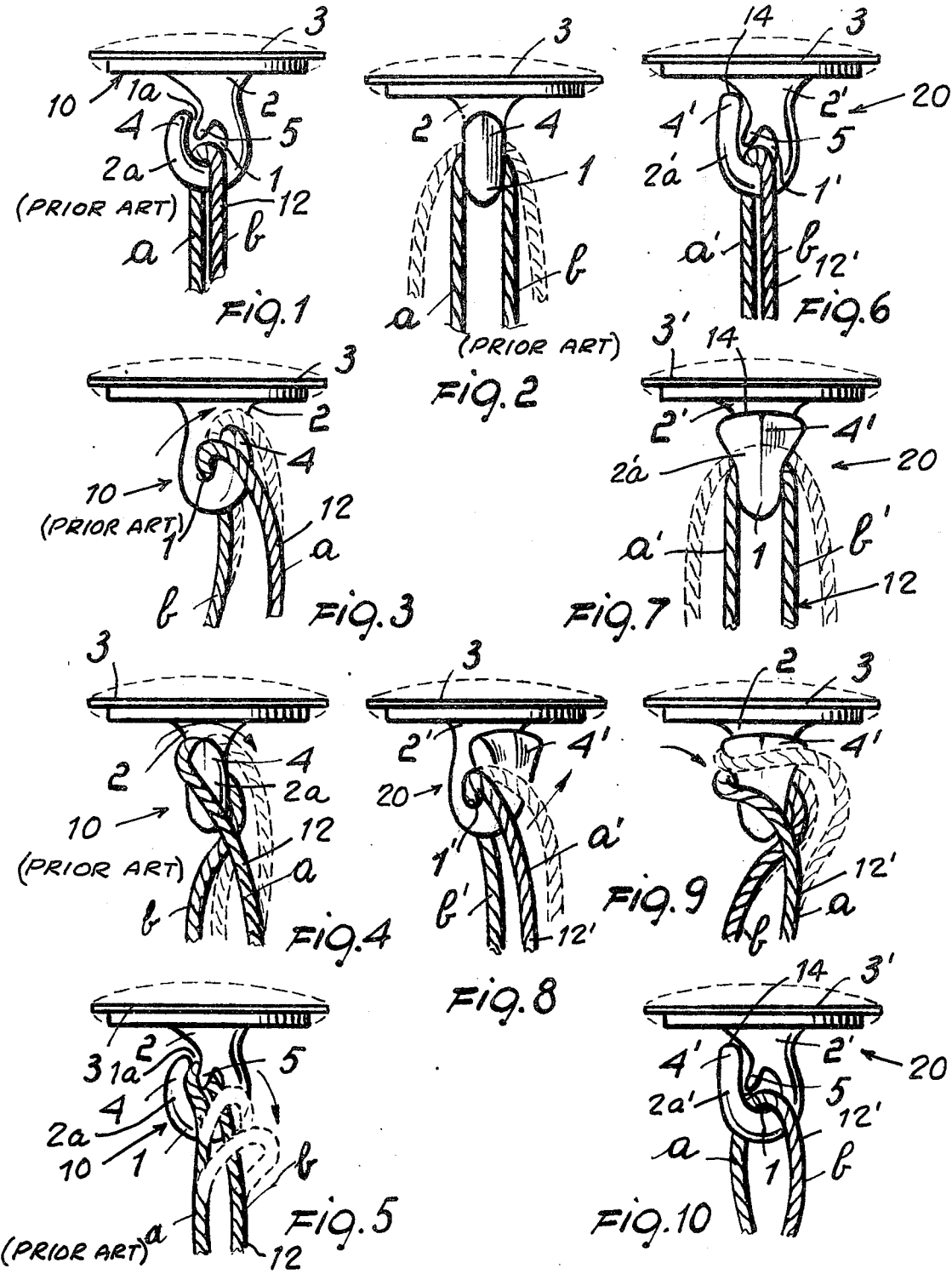

BUTTON, PARTICULARLY SUITABLE FOR PILLOWS AND MATTRESSES

BACKGROUND OF THE INVENTION

FIELD OF THE INVENTION

This invention relates in general to button construction and in particular to a button, particularly suitable for pillows, mattresses and like, having a hook for hooking and stopping the twine or cord which has an enlarged end for hiding an opposed spring catch.

In U.S. Pat. No. 1,995,857, Manson it was already known how to make a button with a hook having an end bent inwardly against the hook shank, and having an end portion bent outwardly.

The U.S. Pat. No. 2,081,259 to Abell discloses a button with a hook arranged perpendicularly to the shank and with the hook end opposed to the ending part of the shank itself.

In the U.S. Pat. No. 510,247 Engel the ending part of a hook has a spheric shape and is opposed to the shank of the hook.

In the U.S. Pat. No. 2,787,435 to Shields make a button with a hook end which is opposed in front of the end of a spring catch which also begins at the hook base. Further U.S. Pat. Ser. No. 27,857 to Casale discloses a button with a hook, the end of which is opposed —for a long length—to the spring catch end which begins not at the hook base, but at a spaced location from the case along the shank. All the above mentioned solutions and others permit twine not only to come in the loop formed by the hook but also to come out, even if in particular cases only when the twine is loosened (e.g. as shown in the U.S. Pat. application Ser. No. 27,857 Casale).

SUMMARY OF THE INVENTION

The button according to this invention solves perfectly the problems met using buttons previously disclosed.

First of all it is characterized in that the hook end has triangular outline enlarging its sides outwards along the ending length.

Further it is characterized in that the hook end ends spaced only slightly away from the button base.

The hook end advantageously has a vertical outside surface i.e. perpendicular to the base, instead of being bent inwardly. Such features, combined all together, allow the ending hook part to hide completely the spring catch and prevent the twine, which was previously threaded in the loop formed by said hook, to come out, even if the twine is loosened.

Accordingly it is an object of the invention to provide an improved button construction which includes a base portion with a hook shank extending outwardly from the base portion and being curved around to form a loop with an outer end which overlies a spring catch formation which is formed as an extension outwardly from the initial part of the shank adjacent the base and which outer portion is made of substantially triangular configuration with the widened portion being adjacent the base in a position to overlie and cover the spring catch and which extends substantially perpendicular to the base.

A further object of the invention is to provide a button construction which is simple in design, rugged in construction and economical to manufacture.

For an understanding of the principles of the invention, reference is made to the following description of a typical embodiment thereof as illustrated in the accompanying drawings.

BRIEF DESCRIPTION OF THE DRAWINGS

In the drawings:

FIGS. 1 to 5 show respective side and front elevation views of a button hook constructed in accordance with the prior art;

FIGS. 6 to 10 show respective side and front elevational views of a button hook constructed in accordance with the invention.

DESCRIPTION OF THE PRIOR ART

As seen in FIGS. 1 to 5 a known button construction generally designated 10 includes a flat, for example rounded base 3 with a hook shank 2 extending outwardly from the base and being curved around to substantially enclose a loop 1 having an access opening 1a adjacent an end 4 of an outer leg portion 2a. In the prior art construction a spring catch comprises a formation 5 which extends outwardly from the hook shank at a spaced location from the base 3 and provides an obstruction in the openings 1a between the spring catch 5 and the end 4 permitting passage of twine 12. In the prior art construction the end 4 is tapered substantially to a point. With the prior art construction of the button 10 there is a tendency for the twine 12 to become dislodged from the hook especially when either of the yarn portions A or B are loosened. When either the length a of the twine is caused to move to the right or the length b is caused to move to the left for example the twine 12 is forced to go into the loop of the hook over the length b or the length a as the case may be and thereof ore come out of the loop and be disengaged from the hook.

GENERAL DESCRIPTION OF THE PREFERRED EMBODIMENT

In accordance eith the invention there is provided a button hook generally designated 20 which includes a button base portion which for example may be a flat, round member 3. A hook shank 2' includes a widened shank base and it extends outwardly from the base 3 and is curved around to form a loop 1'. The inventive construction includes an outer leg portion 2a' which extends substantially perpendicular to the button base 3 and the upper portion thereof is widened to form an end or point 4' of triangular configuration with the widest or base portion of the triangle being located at the end which is adjacent to the button base 3'.

As shown in FIGS. 6 to 10 the triangular shaped end 4' is an edge 14 forming the base portion of the triangle which is curved gradually from side to side. The twine 12' which is engaged over the loop has leg portions a' and b' and it can be seen from the drawings of the invention shown in FIGS. 6 to 10 that the construction of the button makes it substantially impossible for the twine 12' to become disengaged therefrom. In the embodiment shown in FIGS. 8 to 10 the edge 14 lies closely adjacent the widened base portion of the hook shank 2'.

What is claimed is:

1. A button particularly for pillows and mattresses, comprising a wide base portion, a hook shank connected to said base portion and being curved outwardly therefrom to enclose a hook loop, a spring catch extending from said shank from a location adjacent the end of said shank connected to said base portion and extending into the loop, said shank having an outer leg portion and a widened substantially triangular end in proximity to the portion of said shank adjacent said base portion with the widest portion of the triangular configuration being at the edge of said hook shank including a widened base portion, the edge of said hook shank forming the base of the triangular configuration being in closely spaced relationship to the widened base portion of said shank.

2. A button according to claim 1 wherein said outer leg portion of said hook is substantially perpendicular to said base portion.

* * * * *